United States Patent
Wang et al.

(10) Patent No.: US 11,819,381 B2
(45) Date of Patent: Nov. 21, 2023

(54) DENTAL IMPLANT SYSTEM WITH SURFACE GRADIENT MICROPOROUS STRUCTURE AND A PREPARATION METHOD THEREOF

(71) Applicant: Xiaohui Wang, Dalian (CN)

(72) Inventors: Xiaohui Wang, Dalian (CN); Jian Wang, Dalian (CN); Liyuan Sheng, Dalian (CN)

(73) Assignee: Xiaohui Wang, Dalian (CN)

( * ) Notice: Subject to any disclaimer, the term of this patent is extended or adjusted under 35 U.S.C. 154(b) by 0 days.

(21) Appl. No.: 18/131,877

(22) Filed: Apr. 7, 2023

(65) Prior Publication Data

US 2023/0240811 A1 Aug. 3, 2023

(30) Foreign Application Priority Data

Jun. 17, 2022 (CN) .......................... 202210690825.5

(51) Int. Cl.
*A61C 8/00* (2006.01)
(52) U.S. Cl.
CPC .......... *A61C 8/0039* (2013.01); *A61C 8/0069* (2013.01); *A61C 2008/0046* (2013.01); *A61C 2201/00* (2013.01)
(58) Field of Classification Search
CPC .......... A61C 2008/0046; A61C 8/0039; A61C 8/0069
See application file for complete search history.

(56) References Cited

U.S. PATENT DOCUMENTS

| | | | | |
|---|---|---|---|---|
| 10,357,297 | B2 * | 7/2019 | Tsai | A61L 31/146 |
| 11,484,396 | B1 * | 11/2022 | Sanderson | A61C 8/0036 |
| 2011/0123951 | A1 * | 5/2011 | Lomicka | A61C 8/0074 |
| | | | | 433/201.1 |
| 2012/0129132 | A1 * | 5/2012 | Lomicka | A61C 8/0033 |
| | | | | 433/173 |
| 2013/0344459 | A1 * | 12/2013 | Collins | A61C 8/0037 |
| | | | | 433/201.1 |
| 2020/0030102 | A1 * | 1/2020 | Mullens | A61F 2/34 |
| 2020/0100874 | A1 * | 4/2020 | Ruetschi | A61F 2/30767 |
| 2021/0153982 | A1 * | 5/2021 | Wernle | A61C 13/0018 |
| 2021/0330431 | A1 * | 10/2021 | Yang | A61C 8/0051 |
| 2022/0387143 | A1 * | 12/2022 | Wysocki | A61C 8/0006 |

(Continued)

FOREIGN PATENT DOCUMENTS

| | | |
|---|---|---|
| CN | 201642387 | 11/2010 |
| CN | 106037965 A | 10/2016 |
| CN | 111227965 A | 6/2020 |

*Primary Examiner* — Ralph A Lewis

(57) ABSTRACT

The invention provides a dental implant system with a surface gradient microporous structure and a preparation method thereof. The dental implant system includes a non-threaded micro-cone cylindrical dental implant and an abutment, wherein the dental implant includes a microporous layer with a bionic bone trabecular structure and a base with extremely high density and mechanical strength. The dental implant system of the invention has both the precision of the internal structure and the bionic characteristics of the surface structure, which effectively improves the long-term stability after implantation, reduces the complexity of the processing process of the dental implant system, and can realize personalized and batch production.

10 Claims, 4 Drawing Sheets

(56) References Cited

U.S. PATENT DOCUMENTS

| | | | |
|---|---|---|---|
| 2023/0218373 A1* | 7/2023 | Blay | A61C 13/0004 433/201.1 |
| 2023/0263600 A1* | 8/2023 | Chenaux | A61C 8/005 433/173 |

* cited by examiner

DENTAL IMPLANT SYSTEM WITH SURFACE GRADIENT MICROPOROUS STRUCTURE AND A PREPARATION METHOD THEREOF

FIELD OF THE INVENTION

The present invention relates to the technical field of dental implants, in particular to a dental implant system with surface gradient microporous structure and a preparation method thereof.

BACKGROUND OF THE INVENTION

At present, an area of a bonding interface between the dental implant and the bone for oral implant restoration is very small, wherein the bonding interface is about 10-50 μm. However, the surface layer of the dental implant has not formed a porous structure with a suitable depth, and its elastic modulus (~100 GPa) is still many times higher than that of an alveolar bone (~15 GPa). The significant difference in the elastic modulus between the dental implant and the alveolar bone inevitably leads to a significant stress shielding effect, resulting in local stress concentration, which will affect the bone resorption in this part, increase the healing time at initial stage of the implant, and affect long-term stability of the dental implant.

At the same time, the current mainstream dental implants are implanted by rotary cutting. Although the surface-specific thread structure can achieve this goal, the rotation into place may cause excessive bone compression and bone burns, and also cause fatigue of the dental implant. In addition to the existence of the internal connecting thread, it is easy to break and fail when the load is too high.

Moreover, the current production of dental implant systems basically uses precision CNC machine tools for precision machining. High reliance on cutting, long production process, and low production efficiency all increase the production cost and quality control difficulty of dental implants. The surface of the dental implants is treated by sandblasting, acid etching and other methods, which will cause problems such as environmental pollution and occupational disease risks.

In view of this, the present invention is proposed.

SUMMARY OF THE INVENTION

A first objective of the present invention is to provide a dental implant system with a surface gradient microporous structure. The surface of the dental implant system includes a bionic bone trabecular structure with a gradient distribution, which can fundamentally solve problems of stress conduction and stress concentration, improve the stress distribution of the bone tissue around the implant, reduce the occurrence of complications, and effectively improve the long-term stability of the dental implants after implantation. At the same time, the central screw and internal and external threads are eliminated in the dental implant, which avoids excessive bone extrusion and bone burn caused by rotation in place. There is no possibility of the central screw breaking, and there is basically no possibility of the dental implant breaking.

A second objective of the present invention is to provide a preparation method of the abovementioned dental implant system. The preparation method uses laser 3D printing technology to prepare the microporous layer, which avoids the problems caused by sandblasting and acid etching. The preparation method uses the powder metallurgy rapid prototyping technology to prepare the base, which avoids the precision problem of powder metallurgy preparation of complex microstructure parts. The preparation method uses the diffusion bonding to realize the stable combination of the abovementioned two parts. The process of preparing the overall synthesis step by step can effectively shorten the processing time and improve the production efficiency.

Specifically, in order to achieve the above objectives, the following technical schemes are adopted in the present invention:

The present invention provides a dental implant system with a surface gradient microporous structure, which includes a non-threaded micro-cone cylindrical dental implant. The dental implant includes a base and a microporous layer coating on an outside of the base. The microporous layer is a bionic bone trabecular structure, and a porosity and a micro-pore size of the microporous layer increase sequentially from inside to outside.

Preferably, the porosity of an inner wall of the microporous layer along a radial direction is 20% to 30%, and the porosity of an outer wall of the microporous layer along the radial direction is 50% to 60%, the micro-pore size of the inner wall of the microporous layer along the radial direction is 20 μm to 40 μm, and the micro-pore size of the outer wall of the microporous layer along the radial direction is 150 μm to 300 μm. The gradient microporous structure can achieve better bone ingrowth effect and better bone tissue integration ability, and can gradually reduce the elastic modulus, and promote the reasonable stress conduction and stress distribution in the bone.

Preferably, the microporous layer is made of a low modulus titanium alloy and pure tantalum material. The porous titanium alloy can effectively reduce the overall elastic modulus, which is closer to the elastic modulus of bone tissue, and has the advantages of good biocompatibility, antibacterial and corrosion resistance.

Preferably, a transition layer is disposed between the microporous layer and the base, and the transition layer is made of an aluminum alloy material with a melting point of 660-640° C., which can realize a medium-temperature connection between the microporous layer and the base.

Preferably, the dental implant system also includes an abutment docked with the dental implant. The abutment includes an upper cone section and a lower cone section, a non-tapered transition zone is disposed between the upper cone section and the lower cone section, and the lower cone section of the abutment is inserted into the dental implant. The lower cone section of the abutment is inserted through the Morse taper. The Morse taper is preferably 4°, which can achieve the effect of cold welding connection, avoid the invasion of microorganisms into the dental implant, and improve the comprehensive mechanical properties of the dental implant to reduce mechanical complications. The reason why the taper-free transition zone is disposed between the upper cone section and the lower cone section is that the cold welding effect of the dental implant and the abutment can be better increased.

Preferably, the dental implant system further includes an ejection bolt, and an internal thread structure is disposed inside the lower cone section of the abutment, and the internal thread structure cooperates with the ejection bolt. The internal thread structure can just cooperate with the ejection bolt for the removal of the abutment. Therefore, the processing precision requirement is reduced, the manufacturing process is simplified, the difficulty of taking out the abutment is reduced, and the convenience of revision operation is improved.

Preferably, a titanium alloy layer with a height of 0.8-1.2 mm is disposed on a top surface of the dental implant docked with the abutment. The integrally prepared titanium alloy layer can ensure that the infection rate is effectively reduced during the healing process of the soft tissue after the dental implant is implanted.

In addition to the above-mentioned dental implant system, the present invention also provides a preparation method of the above-mentioned dental implant system, which includes the following steps: preparing respectively the microporous layer and the base of the dental implant, and assembling various components that make up the dental implant; wherein the preparing method of the microporous layer includes: sintering and forming on a surface of a preformed tapered cylinder by laser 3D printing to obtain the microporous layer with the bionic bone trabecular structure. The use of laser 3D printing can make the microporous layer have a smooth inner surface, and is convenient for subsequent assembly, and does not require surface treatment, which can significantly reduce costs, reduce pollution, and reduce dependence on high-precision cutting equipment.

Preferably, the preparing method of the base includes the following steps:
- compacting a Ti-6Al-4V alloy powder, and pressurizing at 0.5-1Mpa to obtain a low-pressure compacted rough blank with a compactness of 65-75%;
- pressurizing the low-pressure compacted rough billet at 3-5Mpa to obtain a medium-pressure compacted blank with a compactness of 75-85%;
- pressurizing the medium-pressure compacted blank at 10-15Mpa to obtain a medium blank with a compactness of 85-98%;
- pressurizing the medium blank at 20-25Mpa under 900-1100° C., and keep it warm for 0.5 h to obtain the base with a compactness greater than 98%.

Through the process combination of low-pressure, medium-pressure, high-pressure and hot isostatic pressing, different types of base parts can be produced simultaneously, and the process flow can be shortened. At the same time the base has extremely high compactness and mechanical strength, which greatly reduces the mechanical complications after implantation.

Preferably, the preparation method of the dental implant system further includes the step of preparing an abutment and an ejection bolt by means of precision machining, and the abutment the ejection bolt are used in conjunction with the assembled dental implant. The requirement of machining precision is low, which simplifies the process flow.

Preferably, the method for assembling the dental implant includes: sequentially assembling the microporous layer, the transition layer and the base.

The method for sequentially the microporous layer, the transition layer and the base includes:
- placing a thin-walled conical tube transition layer of aluminum alloy with the same shape and a matching size into the microporous layer for completing an assembly of the microporous layer and the transition layer to form an outer assembly;
- placing the base within the outer assembly to obtain the dental implant;
- compacting the dental implant, and a diffusion connection is completed by hot isostatic pressing, wherein the hot isostatic pressing is divided into two stages;
- a temperature of a first stage is set according to the transition layer of different materials, among which the transition layer of aluminum alloy is 640° C., and a holding time is 0.5 h;
- a temperature of a second stage is 1000° C., and a holding time is 0.5 h, and a pressure in the whole process is kept at 15-20Mpa;
- performing a secondary compaction and overall cleaning on the dental implant after hot isostatic pressing to remove impurities, unsintered particles and dirt on the surface.

Using the production idea of step-by-step preparation and overall synthesis, through the combination of step-by-step procedures and refined processes, the precise manufacturing of the dental implant system can be realized, which can effectively shorten the processing conducive to personalized customization and mass production.

The shortcomings of the manufacturing process of the traditional dental implant system include:
(1) the dental implant system is processed and manufactured by numerical control equipment, which is easy to affect the processing accuracy due to the wear of the machine tool itself or the knives;
(2) the connection between the dental implant and the abutment is fastened with a central screw, and complications such as breakage of the central screw may occur due to improper force during the chewing process;
(3) the surface of the dental implant needs to be acid-etched and sand-blasted to cause dust and waste liquid pollution;
(4) there is a threaded structure on the outside of the dental implant, which may lead to material fatigue failure due to stress concentration; and
(5) limited by the processing method, it is impossible to mass-produce the dental implants in a short period of time.

Compared with the prior art, the beneficial effects of the present invention include:
(1) In the dental implant system of the present invention, the microporous layer of the dental implant is a bionic bone trabecular structure, which can solve the problems of stress conduction and stress concentration, realize bone ingrowth healing of the dental implant, save more than 80% of clinical healing time, and improve long-term stability of dental implants.
(2) The dental implant is designed as a non-threaded micro-cone cylindrical structure, without central screws and external threads, which can reduce bone burns caused by heat production during implantation, and there is no possibility of central screw breakage, basically no possibility of dental implant breaking.
(3) The dental implant and the abutment are retained by the mechanical friction force generated by the tapered wall to achieve the effect of cold welding, which can avoid the invasion of micro-organisms into the dental implant, and simultaneously improves the comprehensive mechanical properties of the dental implant to reduce mechanical complications.
(4) Due to the short healing period (3-4 weeks) of the dental implant system prepared by the present invention, the incidence of early complications will be far lower than that of traditional dental implants; due to the cancellation of the central screw and internal and external threads, and the bone trabecular structure can effectively increase the mechanical conduction effect of the surrounding bone, the long-term mechanical complications of dental implants incidence will be greatly reduced.

(5) In the preparation process of the dental implant system, the present invention adopts the method of step-by-step preparation and overall synthesis, which can improve the precision and mechanical strength of the dental implant system, and simultaneously reduce the process complexity, and achieve the effect of fast, batch and personalized production.

BRIEF DESCRIPTION OF THE DRAWINGS

Various other advantages and benefits will become apparent to those of ordinary skill in the art upon reading the following detailed description of the preferred embodiments. The drawings are only for the purpose of illustrating preferred embodiments and are not to be considered as limiting the invention. Also throughout the drawings, the same reference numerals are used to designate the same components. In the attached drawings.

DESCRIPTION OF THE PREFERRED EMBODIMENTS

Figure 1:
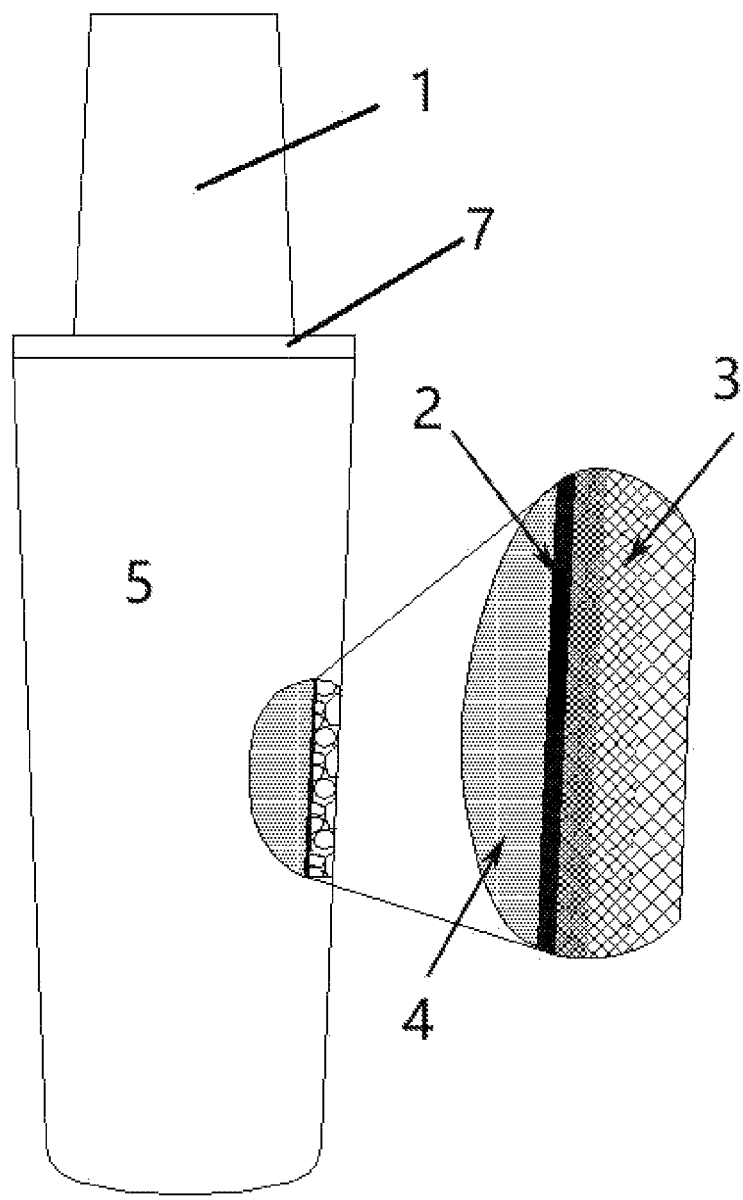
FIG. 1 is an overall and partial cross-sectional diagram of a dental implant system.
Figure 2:
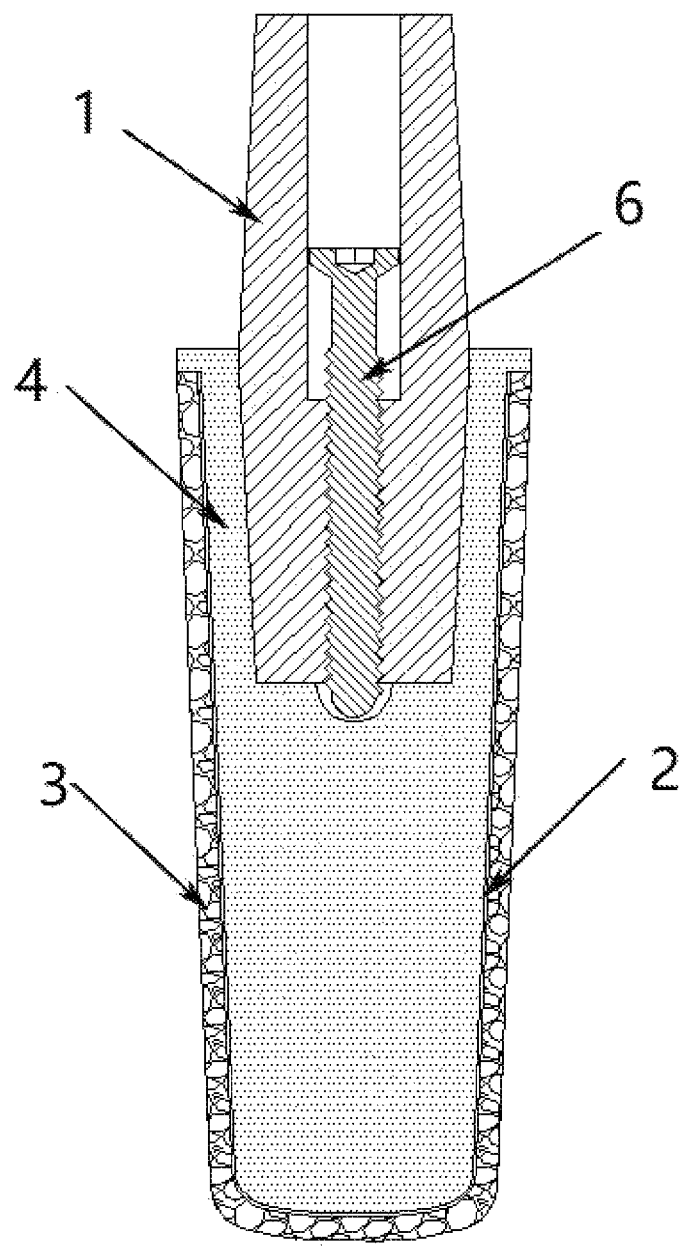
FIG. 2 is a cross-sectional diagram of the dental implant system including ejection bolts.
Figure 3:
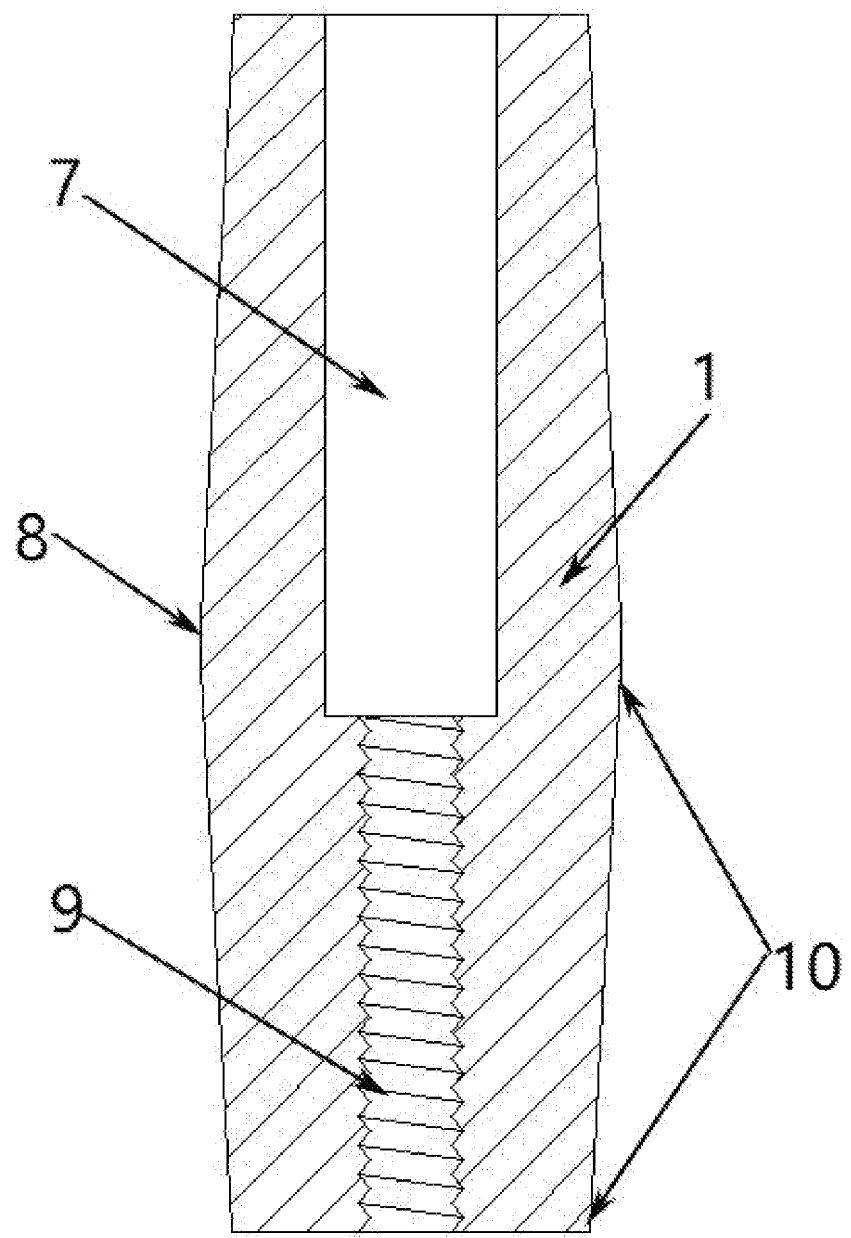
FIG. 3 is a cross-sectional diagram of the abutment.

The technical schemes of the present invention will be clearly and completely described below in conjunction with the embodiments and the accompanying drawings. Those skilled in the art will understand that the following embodiments are only for illustrating the present invention, and should not be considered as limiting the scope of the present invention. Those who do not indicate the specific conditions in the embodiments are carried or according to the conventional conditions or the conditions suggested by the manufacturer. The reagents or instruments used were not indicated by the manufacturer, and they were all conventional products that could be purchased from the market.

Embodiment 1

The preparation method of the dental implant system includes the following steps:

1. By referring to the structure and shape of human trabecular bone, designing a three-dimensional micro-porous structure and a small taper conical wall with a similar shape, and importing it into the printing molding program. Using laser 3D forming technology, pure tantalum powder and low elastic modulus titanium alloy are sintered on the surface of the preformed thin-walled conical barrel according to the established design. A microporous layer 3 with a bionic bone trabecular structure is obtained through regulation and control, and the porosity and pore size of the microporous layer 3 increase sequentially from the inside to the outside. The micro-pore size of the inner wall of the microporous layer 3 is 20 μm, and the porosity of the inner wall of the microporous layer 3 is 20%; the micro-pore size in the middle part of the microporous layer 3 gradually increases to 150 μm, and the porosity gradually increases to 40%; and the micro-pore size of the outer wall of the microporous layer 3 finally increases to 300 μm, and the porosity gradually increases to 60%.

2. Putting the aluminum alloy thin-walled tapered transition layer 2 with the same shape and matching size into the microporous layer 3 to complete the assembly of the microporous layer 3 and the transition layer 2 to form an external assembly.

3. Putting the sieved Ti-6Al-4V alloy powder into a low-pressure compaction mold, and applying a pressure of 0.7 MPa at room temperature to obtain a low-pressure compacted rough blank with a compactness of about 70%. Secondly, putting the low-pressure compacted rough blank into a medium-pressure pre-shaping mold, and applying a pressure of 4 MPa at room temperature to obtain a medium-pressure compacted blank with a compactness of about 80%. Then, putting the medium-pressure compacted blank into a high-pressure shaping mold, and applying a pressure of 13 MPa at room temperature to obtain a high-pressure shaped blank with a compactness of about 90%. Finally, putting the high-pressure shaped blank into a hot isostatic pressing mold, applying a pressure of 23 MPa at 1000° C., and keeping it warm for a holding time of 0.5 h to obtain a base 4 with a compactness greater than 98%. A titanium alloy layer 7 with a height of 1 mm is disposed on the top surface abutting with the abutment 1.

4. Putting the base 4 obtained by powder metallurgy into the external assembly to obtain the assembled dental implant 5. The assembled dental implant 5 is fixed upside down on a specific mold, so that the three-layer structure is in close contact, and then it's placed in a hot isostatic pressing furnace for diffusion connection and secondary compaction, wherein the temperature is set in two stages. The heating temperature of the first stage is set to 640° C., and a holding time is 0.5 h; the heating temperature of the second stage is 1000° C., and a holding time is 0.5 h; and the pressure in the whole process is kept at 15 MPa. After strict quality inspection of finished products, overall cleaning and cleaning treatment are carried out to remove surface impurities, unsintered particles, and dirt. The finished products are put into storage after marking, packaging and sterilization.

5. The matching abutment 1 and the ejection bolt 6 and other accessories are prepared through mechanical precision machining, wherein the abutment 1 has an upper cone section and a lower cone section. A non-tapered transition zone 8 is disposed between the upper cone section and the lower cone section. The Morse taper of the lower cone section 10 is 4°, and it has an internal thread structure 9 matched with the ejection bolt 6. The healing abutment is equipped with a soft tissue healing cap made of HTTP material, and the diameter of the dental implant is calibrated with a color code to facilitate later clinical restoration needs.

6. During clinical implantation, using supporting tools to prepare the bone bed, and performing corresponding drilling procedures according to different types of bone hardness. After drilling, using a metal rod of equal size in the tool box to measure the resistance entering the bone. Taking out the dental implant 5 with the healing abutment from the aseptic package, tapping the healing abutment with light force to make the dental implant 5 enter the bone until it is fully in place. Pressing the matching soft tissue healing protective cap onto the healing abutment. The surgical operation is completed by suturing the wound.

7. When replacing the abutment in clinical repair, opening the screw sealing hole of the healing abutment, using a screwdriver and a torque wrench to rotate clockwise, the ejection bolt 6 will push down into the groove in the implant, and gently eject the healing abutment. Then, under the action of the occlusal force, the reliable connection between the abutment 1 and the dental implant 5 is realized.

Embodiment 2

1. By referring to the structure and shape of human trabecular bone, designing a three-dimensional micro-porous structure and a small taper conical wall with a similar shape, and importing it into the printing molding program. Using laser 3D forming technology, pure tantalum powder and low elastic modulus titanium alloy are sintered on the surface of the preformed thin-walled conical barrel according to the established design. A microporous layer 3 with a bionic bone trabecular structure is obtained through regulation and control, and the porosity and pore size of the microporous layer 3 increase sequentially from the inside to the outside. The micro-pore size of the inner wall of the microporous layer 3 is 40 μm, and the porosity of the inner wall of the microporous layer 3 is 30%; the micro-pore size in the middle part of the microporous layer 3 gradually increases to 120 μm, and the porosity gradually increases to 40%; and the micro-pore size of the outer wall of the microporous layer 3 finally increases to 150 μm, and the porosity gradually increases to 50%.

2. Putting the aluminum alloy thin-walled tapered transition layer 2 with the same shape and matching size into the microporous layer 3 to complete the assembly of the microporous layer 3 and the transition layer 2 to form an external assembly.

3. Putting the sieved Ti-6Al-4V alloy powder into a low-pressure compaction mold, and applying a pressure of 1 MPa at room temperature to obtain a low-pressure compacted rough blank with a compactness of about 75%. Secondly, putting the low-pressure compacted rough blank into a medium-pressure pre-shaping mold, and applying a pressure of 5 MPa at room temperature to obtain a medium-pressure compacted blank with a compactness of about 85%. Then, putting the medium-pressure compacted blank into a high-pressure shaping mold, and applying a pressure of 15 MPa at room temperature to obtain a high-pressure shaped blank with a compactness of about 95%. Finally, putting the high-pressure shaped blank into a hot isostatic pressing mold, applying a pressure of 25 MPa at 1000° C., and keeping it warm for a holding time of 0.5 h to obtain a base 4 with a compactness greater than 98%. A titanium alloy layer 7 with a height of 0.8 mm is disposed on the top surface abutting with the abutment 1.

4. Putting the base 4 obtained by powder metallurgy into the external assembly to obtain the assembled dental implant 5. The assembled dental implant 5 is fixed upside down on a specific mold, so that the three-layer structure is in close contact, and then it's placed in a hot isostatic pressing furnace for diffusion connection and secondary compaction, wherein the temperature is set in two stages. The heating temperature of the first stage is set to 640° C., and a holding time is 0.5 h; the heating temperature of the second stage is 1000° C., and a holding time is 0.5 h; and the pressure in the whole process is kept at 20 MPa. After strict quality inspection of finished products, overall cleaning and cleaning treatment are carried out to remove surface impurities, unsintered particles, and dirt. The finished products are put into storage after marking, packaging and sterilization.

5. The matching abutment 1 and the ejection bolt 6 and other accessories are prepared through mechanical precision machining, wherein the abutment 1 has an upper cone section and a lower cone section. A non-tapered transition zone 8 is disposed between the upper cone section and the lower cone section. The Morse taper of the lower cone section 10 is 4°, and it has an internal thread structure 9 matched with the ejection bolt 6. The healing abutment is equipped with a soft tissue healing cap made of HTTP material, and the diameter of the dental implant is calibrated with a color code to facilitate later clinical restoration needs.

6. During clinical implantation, using supporting tools to prepare the bone bed, and performing corresponding drilling procedures according to different types of bone hardness. After drilling, using a metal rod of equal size in the tool box to measure the resistance entering the bone. Taking out the dental implant 5 with the healing abutment from the aseptic package, tapping the healing abutment with light force to make the dental implant 5 enter the bone until it is fully in place. Pressing the matching soft tissue healing protective cap onto the healing abutment. The surgical operation is completed by suturing the wound.

7. When replacing the abutment in clinical repair, opening the screw sealing hole of the healing abutment, using a screwdriver and a torque wrench to rotate clockwise, the ejection bolt 6 will push down into the groove in the implant, and gently eject the healing abutment. Then, under the action of the occlusal force, the reliable connection between the abutment 1 and the dental implant 5 is realized.

Embodiment 3

1. By referring to the structure and shape of human trabecular bone, designing a three-dimensional micro-porous structure and a small taper conical wall with a similar shape, and importing it into the printing molding program. Using laser 3D forming technology, pure tantalum powder and low elastic modulus titanium alloy are sintered on the surface of the preformed thin-walled conical barrel according to the established design. A microporous layer 3 with a bionic bone trabecular structure is obtained through regulation and control, and the porosity and pore size of the microporous layer 3 increase sequentially from the inside to the outside. The micro-pore size of the inner wall of the microporous layer 3 is 30 μm, and the porosity of the inner wall of the microporous layer 3 is 25%; the micro-pore size in the middle part of the microporous layer 3 gradually increases to 150 μm, and the porosity gradually increases to 40%; and the micro-pore size of the outer wall of the microporous layer 3 finally increases to 200 μm, and the porosity gradually increases to 55%.

2. Putting the aluminum alloy thin-walled tapered transition layer 2 with the same shape and matching size into the microporous layer 3 to complete the assembly of the microporous layer 3 and the transition layer 2 to form an external assembly.

3. Putting the sieved Ti-6Al-4V alloy powder into a low-pressure compaction mold, and applying a pressure of 0.5 MPa at room temperature to obtain a low-pressure compacted rough blank with a compactness of about 65%. Secondly, putting the low-pressure compacted rough blank into a medium-pressure pre-shaping mold, and applying a pressure of 3 MPa at room temperature to obtain a medium-pressure compacted blank with a compactness of about 75%. Then, putting the medium-pressure compacted blank into a high-pressure shaping mold, and applying a pressure of 10 MPa at room temperature to obtain a high-pressure shaped blank with a compactness of about 85%. Finally, putting the high-pressure shaped blank into a hot isostatic pressing mold, applying a pressure of 20 MPa at 1000° C., and keeping it warm for a holding time of 0.5 h to obtain a base 4 with a compactness greater than 98%. A titanium alloy layer 7 with a height of 1.2 mm is disposed on the top surface abutting with the abutment 1.

4. Putting the base 4 obtained by powder metallurgy into the external assembly to obtain the assembled dental implant 5. The assembled dental implant 5 is fixed upside down on a specific mold, so that the three-layer structure is in close contact, and then it's placed in a hot isostatic pressing furnace for diffusion connection and secondary compaction, wherein the temperature is set in two stages. The heating temperature of the first stage is set to 640° C., and a holding time is 0.5 h; the heating temperature of the second stage is 1000° C., and a holding time is 0.5 h; and the pressure in the whole process is kept at 18 MPa. After strict quality inspection of finished products, overall cleaning and cleaning treatment are carried out to remove surface impurities, unsintered particles, and dirt. The finished products are put into storage after marking, packaging and sterilization.

5. The matching abutment 1 and the ejection bolt 6 and other accessories are prepared through mechanical precision machining, wherein the abutment 1 has an upper cone section and a lower cone section. A non-tapered transition zone 8 is disposed between the upper cone section and the lower cone section. The Morse taper of the lower cone section 10 is 4°, and it has an internal thread structure 9 matched with the ejection bolt 6. The healing abutment is equipped with a soft tissue healing cap made of HTTP material, and the diameter of the dental implant is calibrated with a color code to facilitate later clinical restoration needs.

6. During clinical implantation, using supporting tools to prepare the bone bed, and performing corresponding drilling procedures according to different types of bone hardness. After drilling, using a metal rod of equal size in the tool box to measure the resistance entering the bone. Taking out the dental implant 5 with the healing abutment from the aseptic package, tapping the healing abutment with light force to make the dental implant 5 enter the bone until it is fully in place. Pressing the matching soft tissue healing protective cap onto the healing abutment. The surgical operation is completed by suturing the wound.

7. When replacing the abutment in clinical repair, opening the screw sealing hole of the healing abutment, using a screwdriver and a torque wrench to rotate clockwise, the ejection bolt 6 will push down into the groove in the implant, and gently eject the healing abutment. Then, under the action of the occlusal force, the reliable connection between the abutment 1 and the dental implant 5 is realized.

Embodiment 4

The specific operation steps are the same as those in Embodiment 1, except that the porosity of the outer wall of the microporous layer 3 of the dental implant 5 is 65% to 70%, and the micro-pore size of the outer wall of the microporous layer 3 is 350 μm to 500 μm.

Embodiment 5

The specific operation steps are the same as those in Embodiment 1, except that the non-tapered transition zone 8 is not disposed between the upper cone section and the lower cone section of the abutment.

Embodiment 6

The specific operation steps are the same as those in Embodiment 1, except that the titanium alloy layer 7 is not disposed on the top surface of the butt joint between the dental implant 5 abutting with the abutment 1.

Embodiment 7

The specific operation steps are the same as those in Embodiment 1, except that the dental implant 5 has an internal thread and is connected with the abutment 1 by bolts.

Comparative Example 1

Figure 4:
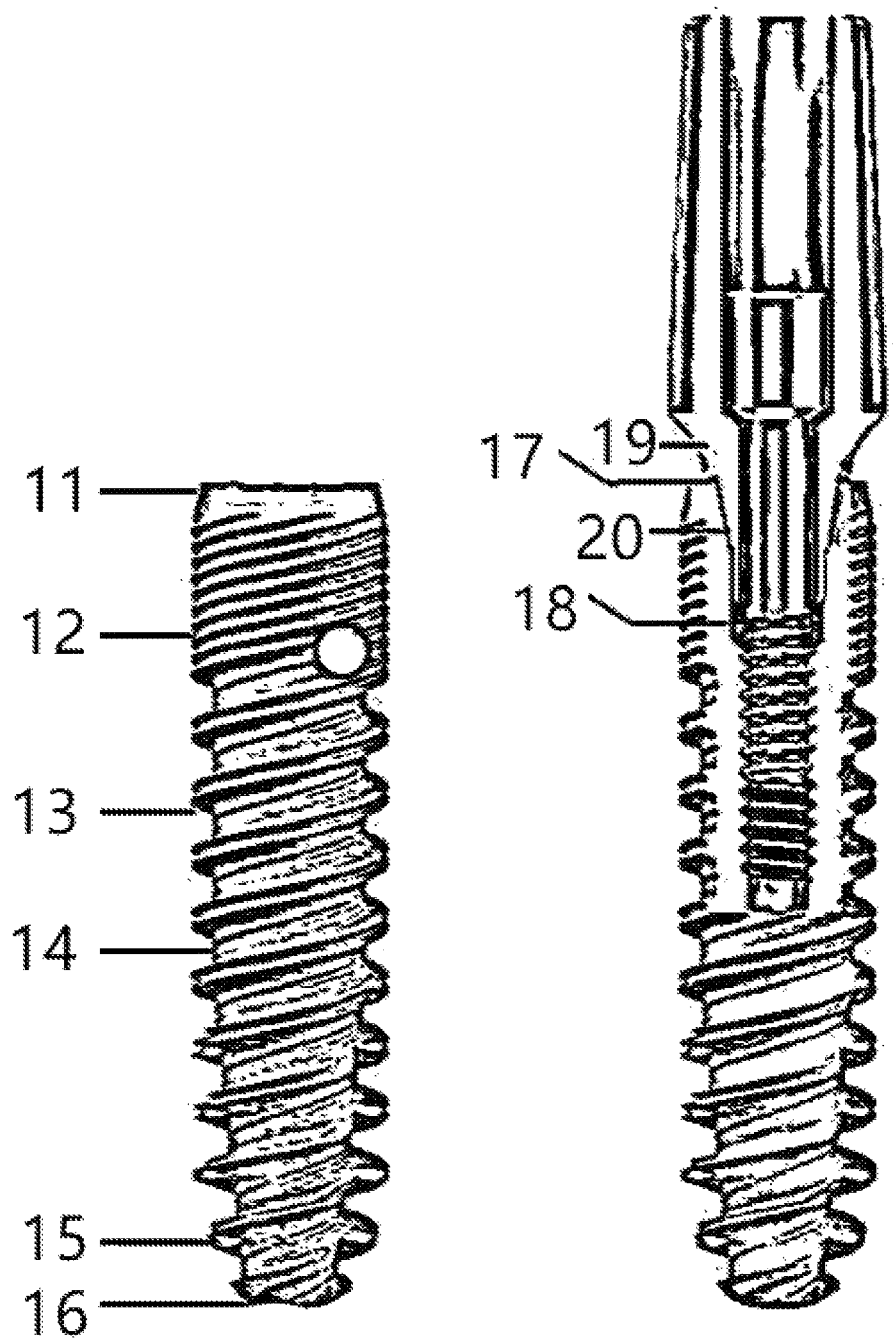
FIG. 4 is a structural diagram of a dental implant system in the prior art.

As shown in FIG. 4, titanium and titanium alloy powder are used, the powder is placed in a specific mold, and put into a hot isostatic pressing device for compaction and sintering to form a dental implant blank with a specific structure. Then, placing the dental implant blank in a vacuum chamber to cool it slowly. When the temperature drops below 200° C., taking it out and cooling it down to room temperature, and cleaning the surface for later use.

A numerical control equipment is used for machining, and a thread structure is manufactured on the surface of the dental implant blank, including a dental implant repair platform 1, a neck thread 12, an excessive thread 13, a main thread 14, an apical root thread 15 and an apical root part 16 to obtain the dental implant. An internal thread structure matching a central screw 18 of a conventional abutment 19 is produced inside the dental implant.

A conventional abutment 19 with an abutment connection area 17, a central screw 18 and an abutment anti-rotation structure 20 is manufactured by using a traditional machining method.

Then, sandblasting and acid etching are performed on the surface of the dental implant to increase the surface roughness of the dental implant, and the apical root part 16 is polished, followed by cleaning, sterilization and packaging.

During clinical implantation, a small hole corresponding to the thread structure on the outer surface of the dental implant is rotated on the patent's alveolar bone with a specific tool, and the dental implant is screwed into the patient's alveolar bone. A healing cap is installed on the conventional abutment 19, the conventional abutment 19 is screwed into the dental implant, and the wound is sutured to complete the surgical operation. Wait for 3-6 months for the alveolar bone tissue to combine with the implant.

When replacing the abutment in clinical repair, using specific tools to unscrew the abutment from the dental implant, removing the healing cap, and then installing the permanent restoration abutment by rotation to complete the implant.

Comparative Example 2

The specific operation steps are the same as those in Embodiment 1, except that the dental implant 5 is not a non-threaded micro-cone cylindrical structure, but presents a helical shape.

Comparative Example 3

The specific operation steps are the same as those in Embodiment 1, except that the microporous layer 3 is not a bionic bone trabecular structure, but has disorderly micropores.

Experimental Example 1

The dental implant systems in Embodiments 1-7 and Comparative Examples 1-3 are subjected to a static compression test, and the specific experimental evaluation methods are as follows.

After assembling the dental implant systems in Embodiments 1-7 and Comparative Examples 1-3, fixing them on a specific compression fixture according to the standard compression test, and performing a static compression test to test the maximum bending loads of the dental implant system and compressive bending moments. The specific measurement data are shown in Table 1 below.

TABLE 1

Static Compression test results

| Group | Maximum Bending Load (N) | Compressive bending moments (N · mm) |
|---|---|---|
| Embodiment 1 | 710.25 | 3898.56 |
| Embodiment 2 | 702.08 | 3861.47 |
| Embodiment 3 | 705.24 | 3871.06 |
| Embodiment 4 | 695.76 | 3791.25 |
| Embodiment 5 | 680.54 | 3723.68 |
| Embodiment 6 | 690.70 | 3819.03 |
| Embodiment 7 | 678.39 | 3687.19 |
| Comparative Example 1 | 544.01 | 2992.07 |
| Comparative Example 2 | 613.29 | 3373.07 |
| Comparative Example 3 | 648.20 | 3565.12 |

Experimental Example 2

The dental implant systems in Embodiments 1-7 and Comparative Examples 1-3 are subjected to a compression fatigue performance experiment, and the specific experimental evaluation methods are as follows.

The assembled dental implant systems in Embodiments 1-7 and Comparative Examples 1-3 are placed in a specific compression fatigue test device for sinusoidal loading and unloading. The maximum load, the minimum load and the number of cycles are shown in Table 2 below.

TABLE 2

Dynamic Compression fatigue test results

| Group | Minimum load (N) | Minimum bending moment (N · mm) | Maximum load (N) | Maximum bending moment (N · mm) | Number of cycles | Results |
|---|---|---|---|---|---|---|
| Embodiment 1 | 34.958 | 192.269 | 349.58 | 1922.69 | 5000000 | Not invalid |
| Embodiment 2 | 34.958 | 192.269 | 349.58 | 1922.69 | 5000000 | Not invalid |
| Embodiment 3 | 34.958 | 192.269 | 349.58 | 1922.69 | 5000000 | Not invalid |
| Embodiment 4 | 34.958 | 192.269 | 349.58 | 1922.69 | 5000000 | Not invalid |
| Embodiment 5 | 34.958 | 192.269 | 349.58 | 1922.69 | 5000000 | Not invalid |
| Embodiment 6 | 34.958 | 192.269 | 349.58 | 1922.69 | 5000000 | Not invalid |
| Embodiment 7 | 38.136 | 209.748 | 381.36 | 2097.48 | 2246580 | Invalid |
| Comparative Example 1 | 38.136 | 209.748 | 381.36 | 2097.48 | 997540 | Invalid |
| Comparative Example 2 | 34.958 | 192.269 | 349.58 | 1922.69 | 2546189 | Invalid |
| Comparative Example 3 | 34.958 | 192.269 | 349.58 | 1922.69 | 5000000 | Invalid |

Experimental Example 3

The dental implant systems in Embodiments 1-7 and Comparative Examples 1-3 are subjected to a vivo implantation experiment, and the specific experimental evaluation methods are as follows.

An adult beagle dog is used as a test animal model, and the dental implant system of Embodiments 1-7 and Comparative Examples 1-3 of the present invention are implanted in its oral cavity. The method includes the following steps:

Ensuring that the experimental animals do not have any adverse reactions or systemic diseases before implantation; and the implantation sites are in the mandibles on both sides to ensure sufficient gingival space, no obvious redness or abnormal exudation of the mucosa, no obvious abnormalities in the occlusal relationship, and no obvious bone wall defects.

The inclusion criteria are unified as much as possible. During the operation, the vital signs such as the animal's breathing, pulse, and heart rate are detected in time to prevent the accidental death of the animal.

Vertical bone resorption at the implant site, gingival descent, and osseointegration implant stability quotient (ISQ) are observed and measured at 12 weeks after operation. The specific data are shown in Table 3 below.

TABLE 3

In vivo implantation test results

| Group | Vertical bone resorption (mm) | Gingival descent (mm) | Osseointegration implant stability quotient (ISQ) |
|---|---|---|---|
| Embodiment 1 | 0.68 | 0.3 | 85 |
| Embodiment 2 | 0.69 | 0.32 | 83 |
| Embodiment 3 | 0.7 | 0.31 | 84 |
| Embodiment 4 | 0.74 | 0.35 | 80 |
| Embodiment 5 | 0.72 | 0.33 | 82 |
| Embodiment 6 | 0.72 | 0.33 | 82 |
| Embodiment 7 | 0.70 | 0.31 | 84 |
| Comparative Example 1 | 0.78 | 0.32 | 75 |
| Comparative Example 2 | 0.75 | 0.34 | 80 |
| Comparative Example 3 | 0.71 | 0.38 | 73 |

As can be clearly seen from the above experimental examples 1-3, Embodiment 1 is the best embodiment provided by the present invention, which is excellent in the tests of compressive strength, compressive fatigue, and osseointegration implant stability quotient in vivo. Furthermore, the data in Embodiments 1-7 is also relatively better than the data in Comparative Examples 1-3. As can be seen that each of the parameters provided in the present invention is the most reasonable design.

As can be clearly seen from Experimental Example 1, the preparation method of Comparative Example 1 is completely different from that of the present invention, wherein it cannot have the mechanical strength of the present invention through integrated CNC machine tool processing, and the maximum bending load and the compression bending moment in Comparative Example 1 are much smaller than other Embodiments 1-7 or other Comparative Examples 2-3. Because Embodiment 7 is connected with the abutment by a bolt, there is no cold welding effect; and because the non-tapered transition zone is not disposed in Embodiment 5, the cold welding effect is lower than other Embodiments. As a result, test results of Embodiments 5 and 7 are lower than other Embodiments. This Experimental Example 1 shows that the dental implant system of the present invention has extremely high mechanical strength.

As can be clearly seen from Experimental Example 2, due to the external helical structure of the dental implant in Comparative Example 1 and Comparative Example 2, the problem of stress concentration resulted in fatigue failure, while the fatigue failure in Embodiment 7 is caused by the internal thread structure of the dental implant. This Experimental Example 2 shows that the non-threaded micro-cone cylindrical structure and the non-internal thread structure adopted in the present invention help to improve the mechanical properties.

As can be clearly seen from Experimental Example 3, the osseointegration effects in Comparative Example 1 and Comparative Example 3 are much weaker due to the absence of the bionic bone trabecular microporous structure of the present invention. Larger micro-pore size leads to slightly larger values of vertical bone resorption and gingival descent, which can easily lead to loose teeth gingival recession and pain. This Experimental Example 3 shows that the bionic bone trabecular microporous structure of the present invention has remarkable bone ingrowth ability and the effect of solving stress concentration.

Finally, it can be understood that the above Embodiments are merely exemplary implementations adopted to illustrate the principle of the present invention, but the present invention is not limited thereto. For those skilled in the art, without departing from the principle and essence of the present invention, various modifications and improvements can be made, and these modifications and improvements are also regarded as the protection scope of the present invention.

What is claimed is:

1. A dental implant system with a surface gradient microporous structure, comprising a non-threaded micro-cone cylindrical dental implant with a surface porous structure, wherein the dental implant comprises a base and a microporous layer coating on an outside of the base, the microporous layer is a bionic bone trabecular structure, and a porosity and a micro-pore size of the microporous layer increase sequentially from inside to outside;
wherein the porosity of an inner wall of the microporous layer along a radial direction is 20% to 30%, and porosity of an outer wall of the microporous layer along the radial direction is 50% to 60%, the micro-pore size of the inner wall of the microporous layer along the radial direction is 20 µm to 40 µm, and the micro-pore size of the outer wall of the microporous layer along the radial direction is 150 µm to 300 µm;
wherein a transition layer is disposed between the microporous layer and the base, and the transition layer is made of an aluminum alloy material with a melting point of 660-640° C.

2. The dental implant system according to claim 1, wherein the microporous layer is made of a low modulus titanium alloy and pure tantalum material.

3. The dental implant system according to claim 1, further comprising:
an abutment docked with the dental implant, the abutment comprises an upper cone section and a lower cone section, a non-tapered transition zone is disposed between the upper cone section and the lower cone section, and the lower cone section of the abutment is inserted into the dental implant.

4. The dental implant system according to claim 3, further comprising an ejection bolt, an internal thread structure is disposed inside the lower cone section of the abutment, and the internal thread structure cooperates with the ejection bolt.

5. The dental implant system according to claim 4, wherein a titanium alloy layer with a height of 0.8-1.2 mm is disposed on a top surface of the dental implant docked with the abutment.

6. A preparation method of a dental implant system with a surface gradient microporous structure, the dental implant system comprising a non-threaded micro-cone cylindrical dental implant with a surface porous structure, the dental implant comprising a base and a microporous layer coating on an outside of the base, the microporous layer is a bionic bone trabecular structure, and a porosity and a micro-pore size of the microporous layer increase sequentially from inside to outside; wherein the porosity of an inner wall of the microporous layer along a radial direction is 20% to 30%, and the porosity of an outer wall of the microporous layer along the radial direction is 50% to 60%, the micro-pore size of the inner wall of the microporous layer along the radial direction is 20 µm to 40 µm, and the micro-pore size of the outer wall of the microporous layer along the radial direction is 150 µm to 300 µm; the preparation method comprising the steps of:
preparing respectively the microporous layer and the base of the dental implant, and assembling various components that make up the dental implant;
wherein the preparing method of the microporous layer includes: sintering and forming on a surface of a preformed tapered cylinder by laser 3D printing to obtain the microporous layer with the bionic bone trabecular structure.

7. The preparation method of the dental implant system according to claim 6, wherein the preparing method of the base comprises the following steps:
compacting a Ti-6Al-4V alloy powder, and pressurizing at 0.5-1Mpa to obtain a low-pressure compacted rough blank with a compactness of 65-75%;
pressurizing the low-pressure compacted rough billet at 3-5Mpa to obtain a medium-pressure compacted blank with a compactness of 75-85%;
pressurizing the medium-pressure compacted blank at 10-15Mpa to obtain a medium blank with a compactness of 85-98%;
pressurizing the medium blank at 20-25Mpa under 900-1100° C., and keep it warm for 0.5h to obtain the base with a compactness greater than 98%.

8. The preparation method of the dental implant system according to claim 6, further comprising the step of preparing an abutment and an ejection bolt by means of precision machining, and the abutment the ejection bolt are used in conjunction with the assembled dental implant.

9. The preparation method of the dental implant system according to claim 6, wherein the method for assembling the dental implant comprises:

sequentially assembling the microporous layer, the transition layer and the base.

10. The preparation method of the dental implant system according to claim 9, wherein the method for sequentially the microporous layer, the transition layer and the base comprises:

placing a thin-walled conical tube transition layer of aluminum alloy with the same shape and a matching size into the microporous layer for completing an assembly of the microporous layer and the transition layer to form an outer assembly;

placing the base within the outer assembly to obtain the dental implant;

compacting the dental implant, and a diffusion connection is completed by hot isostatic pressing, wherein the hot isostatic pressing is divided into two stages;

a temperature of a first stage is set according to the transition layer of different materials, among which the transition layer of aluminum alloy is 640° C., and a holding time is 0.5h;

a temperature of a second stage is 1000° C., and a holding time is 0.5h, and a pressure in the whole process is kept at 15-20Mpa;

performing a secondary compaction and overall cleaning on the dental implant after hot isostatic pressing to remove impurities, unsintered particles and dirt on the surface.

\* \* \* \* \*